(12) United States Patent
Mitchell et al.

(10) Patent No.: US 7,920,371 B2
(45) Date of Patent: Apr. 5, 2011

(54) ELECTRICAL ENERGY STORAGE DEVICES WITH SEPARATOR BETWEEN ELECTRODES AND METHODS FOR FABRICATING THE DEVICES

(75) Inventors: Porter Mitchell, San Diego, CA (US); Xiaomei Xi, Carlsbad, CA (US); Linda Zhong, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 44 days.

(21) Appl. No.: 12/534,148

(22) Filed: Aug. 2, 2009

(65) Prior Publication Data

US 2009/0290288 A1 Nov. 26, 2009

Related U.S. Application Data

(60) Division of application No. 11/016,411, filed on Dec. 17, 2004, now abandoned, which is a continuation-in-part of application No. 10/900,825, filed on Jul. 28, 2004, now Pat. No. 7,102,877.

(60) Provisional application No. 60/512,802, filed on Oct. 20, 2003, provisional application No. 60/502,376, filed on Sep. 12, 2003.

(51) Int. Cl.
*H01G 9/00* (2006.01)

(52) U.S. Cl. ........ 361/502; 361/503; 361/504; 361/509; 361/512; 361/523

(58) Field of Classification Search .................. 361/502, 361/503–504, 508–512, 516–519, 523–528
See application file for complete search history.

(56) References Cited

U.S. PATENT DOCUMENTS

| | | | |
|---|---|---|---|
| 2,234,608 A | 3/1941 | Robinson |
| 2,692,210 A | 10/1954 | Burnham |
| 2,800,616 A | 7/1957 | Becker |
| 3,105,178 A | 9/1963 | Meyers |
| 3,201,516 A | 8/1965 | Weingartner |
| 3,288,641 A | 11/1966 | Rightmire |
| 3,528,955 A | 9/1970 | Lippman |
| 3,536,963 A | 10/1970 | Boos |
| 3,617,387 A | 11/1971 | Grulke |
| 3,648,126 A | 3/1972 | Boos |

(Continued)

FOREIGN PATENT DOCUMENTS

CA 660854 4/1963

(Continued)

OTHER PUBLICATIONS

U.S. Appl. No. 11/251,512, filed on Oct. 14, 2005. A copy is not provided as the application is located in the USPTO's IFW system per 37 CFR 1.98(a)(2)(iii).

(Continued)

*Primary Examiner* — Nguyen T Ha
(74) *Attorney, Agent, or Firm* — Oppedahl Patent Law Firm LLC

(57) ABSTRACT

Films of active electrode material, such as films made from carbon and fibrillized polymer, are attached to a porous separator. Outer surfaces of the films (i.e., surfaces opposite those adjoining the separator) are then covered with current collectors. The 5 resulting stack is usable in fabrication of electrical energy storage devices. The stack can be shaped as needed, connected to terminals, and immersed in an electrolytic solution to provide a double layer capacitor.

8 Claims, 3 Drawing Sheets

U.S. PATENT DOCUMENTS

| | | |
|---|---|---|
| 3,648,337 A | 3/1972 | Greskamp |
| 3,652,902 A | 3/1972 | Hart |
| 3,700,975 A | 10/1972 | Butherus et al. |
| 3,838,092 A | 9/1974 | Vogt |
| 3,864,124 A | 2/1975 | Breton |
| 3,935,029 A | 1/1976 | Baker |
| 3,977,901 A | 8/1976 | Buzzelli |
| 4,012,562 A | 3/1977 | Saunders |
| 4,096,277 A | 6/1978 | Martin |
| 4,129,633 A | 12/1978 | Biddick |
| 4,153,661 A | 5/1979 | Ree |
| 4,161,063 A | 7/1979 | Goebel |
| 4,163,811 A | 8/1979 | Kohlmayer |
| 4,175,055 A | 11/1979 | Goller |
| 4,177,159 A | 12/1979 | Singer |
| 4,187,390 A | 2/1980 | Gore |
| 4,194,040 A | 3/1980 | Breton |
| 4,278,525 A | 7/1981 | Gestaut |
| 4,287,232 A | 9/1981 | Goller |
| 4,313,084 A | 1/1982 | Hosokawa |
| 4,313,972 A | 2/1982 | Goller |
| 4,317,789 A | 3/1982 | Groult |
| 4,320,184 A | 3/1982 | Bernstein |
| 4,320,185 A | 3/1982 | Bernstein |
| 4,327,400 A | 4/1982 | Muranaka |
| 4,336,217 A | 6/1982 | Sauer |
| 4,337,140 A | 6/1982 | Solomon |
| 4,341,847 A | 7/1982 | Sammells |
| 4,354,958 A | 10/1982 | Solomon |
| 4,379,772 A | 4/1983 | Solomon |
| 4,383,010 A | 5/1983 | Spaepen |
| 4,396,693 A | 8/1983 | Bernstein |
| 4,438,481 A | 3/1984 | Phillips |
| 4,440,835 A | 4/1984 | Vignaud |
| 4,457,953 A | 7/1984 | Mc Intyre |
| 4,481,558 A | 11/1984 | Endoh |
| 4,482,931 A | 11/1984 | Yializis |
| 4,500,647 A | 2/1985 | Solomon |
| 4,556,618 A | 12/1985 | Shia |
| 4,562,511 A | 12/1985 | Nishino |
| 4,576,861 A | 3/1986 | Kato |
| 4,594,758 A | 6/1986 | Watanabe |
| 4,597,028 A | 6/1986 | Yoshida |
| 4,622,611 A | 11/1986 | Bennett |
| 4,664,683 A | 5/1987 | Degen |
| 4,683,516 A | 7/1987 | Miller |
| 4,700,450 A | 10/1987 | Michel |
| 4,709,303 A | 11/1987 | Fujiwara |
| 4,725,926 A | 2/1988 | Morimoto |
| 4,725,927 A | 2/1988 | Morimoto |
| 4,730,239 A | 3/1988 | Currie |
| 4,737,889 A | 4/1988 | Nishino |
| 4,758,473 A | 7/1988 | Herscovici |
| 4,760,494 A | 7/1988 | Crum |
| 4,804,592 A | 2/1989 | Vanderborgh |
| 4,805,074 A | 2/1989 | Harakawa |
| 4,822,701 A | 4/1989 | Ballard |
| 4,853,305 A | 8/1989 | Anderman |
| 4,862,328 A | 8/1989 | Morimoto |
| 4,866,117 A | 9/1989 | Egashira |
| 4,877,694 A | 10/1989 | Solomon |
| 4,895,775 A | 1/1990 | Kato |
| 4,908,281 A | 3/1990 | O'Callaghan |
| 4,917,309 A | 4/1990 | Zander |
| 4,985,296 A | 1/1991 | Mortimer, Jr. |
| 4,987,518 A | 1/1991 | Dain |
| 4,992,910 A | 2/1991 | Evans |
| 5,012,385 A | 4/1991 | Kurabayashi |
| 5,019,311 A | 5/1991 | Koslow |
| 5,064,805 A | 11/1991 | Otowa |
| 5,065,286 A | 11/1991 | Kurabayashi |
| 5,071,610 A | 12/1991 | Hagen |
| 5,072,335 A | 12/1991 | Kurabayashi |
| 5,072,336 A | 12/1991 | Kurabayashi |
| 5,072,337 A | 12/1991 | Kurabayashi |
| 5,077,634 A | 12/1991 | Shirata |
| 5,080,963 A | 1/1992 | Tatarchuk |
| 5,086,373 A | 2/1992 | Kurabayashi |
| 5,096,663 A | 3/1992 | Tatarchuk |
| 5,099,398 A | 3/1992 | Kurabayashi |
| 5,100,747 A | 3/1992 | Hayashida |
| 5,102,745 A | 4/1992 | Tatarchuk |
| 5,103,379 A | 4/1992 | Kurabayashi |
| 5,117,065 A | 5/1992 | Savage |
| 5,121,301 A | 6/1992 | Kurabayashi |
| 5,136,472 A | 8/1992 | Tsuchiya |
| 5,136,474 A | 8/1992 | Sarangapani |
| 5,142,451 A | 8/1992 | Kurabayashi |
| 5,144,595 A | 9/1992 | Graham |
| 5,145,752 A | 9/1992 | Goldstein |
| 5,147,539 A | 9/1992 | Hagen |
| 5,147,722 A | 9/1992 | Koslow |
| 5,150,283 A | 9/1992 | Yoshida |
| 5,158,722 A | 10/1992 | Ilic |
| 5,162,178 A | 11/1992 | Ohsawa |
| 5,168,019 A | 12/1992 | Sugeno |
| 5,172,307 A | 12/1992 | Tabuchi |
| 5,190,833 A | 3/1993 | Goldstein |
| 5,198,313 A | 3/1993 | Juergens |
| 5,214,564 A | 5/1993 | Metzler |
| 5,219,673 A | 6/1993 | Kaun |
| 5,227,960 A | 7/1993 | Kunishi |
| 5,253,148 A | 10/1993 | Katsu |
| 5,277,729 A | 1/1994 | Endo |
| 5,304,330 A | 4/1994 | Tatarchuk |
| 5,318,862 A | 6/1994 | Liu |
| 5,350,643 A | 9/1994 | Imahashi |
| 5,351,164 A | 9/1994 | Grigortchak |
| 5,381,301 A | 1/1995 | Hudis |
| 5,381,303 A | 1/1995 | Yoshida |
| 5,393,617 A | 2/1995 | Klein |
| 5,398,155 A | 3/1995 | Sato |
| 5,420,747 A | 5/1995 | Ivanov |
| 5,436,093 A | 7/1995 | Huang |
| 5,442,197 A | 8/1995 | Andrieu |
| 5,450,279 A | 9/1995 | Yoshida |
| 5,453,909 A | 9/1995 | Kobayashi |
| 5,456,000 A | 10/1995 | Gozdz |
| 5,468,674 A | 11/1995 | Walker |
| 5,470,357 A | 11/1995 | Schmutz |
| 5,471,365 A | 11/1995 | Nakamura |
| 5,478,363 A | 12/1995 | Klein |
| 5,478,668 A | 12/1995 | Gozdz et al. |
| 5,482,906 A | 1/1996 | Sakai |
| 5,518,823 A | 5/1996 | Fujihira |
| 5,550,706 A | 8/1996 | Kurzweil |
| 5,557,497 A | 9/1996 | Ivanov |
| 5,581,438 A | 12/1996 | Halliop |
| 5,585,999 A | 12/1996 | De Long |
| 5,593,462 A | 1/1997 | Gueguen |
| 5,620,597 A | 4/1997 | Andelman |
| 5,620,807 A | 4/1997 | Mussell |
| 5,621,607 A | 4/1997 | Farahmandi |
| 5,621,608 A | 4/1997 | Arai |
| 5,636,437 A | 6/1997 | Kaschmitter |
| 5,649,982 A | 7/1997 | Halliop |
| 5,659,457 A | 8/1997 | Lian |
| 5,665,212 A | 9/1997 | Zhong |
| 5,675,553 A | 10/1997 | O'Brien |
| 5,682,288 A | 10/1997 | Wani |
| 5,697,390 A | 12/1997 | Garrison |
| 5,698,342 A | 12/1997 | Klein |
| 5,703,906 A | 12/1997 | O'Brien |
| 5,706,165 A | 1/1998 | Saito |
| 5,707,763 A | 1/1998 | Shimizu |
| 5,714,271 A | 2/1998 | Yamanoi |
| 5,720,780 A | 2/1998 | Liu |
| 5,742,474 A | 4/1998 | Shimizu |
| 5,748,438 A | 5/1998 | Davis |
| 5,748,439 A | 5/1998 | MacFarlane |
| 5,751,541 A | 5/1998 | Li |
| 5,757,675 A | 5/1998 | O'Brien |
| 5,777,428 A | 7/1998 | Farahmandi |
| 5,778,515 A | 7/1998 | Menon |
| 5,781,460 A | 7/1998 | Nguyen |
| 5,785,786 A | 7/1998 | Suzuki |
| 5,786,555 A | 7/1998 | Saito |

| Patent No. | Date | Name | | Patent No. | Date | Name |
|---|---|---|---|---|---|---|
| 5,786,980 A | 7/1998 | Evans | | 6,301,093 B1 | 10/2001 | Noguchi |
| 5,786,981 A | 7/1998 | Aoki | | 6,304,426 B1 | 10/2001 | Wei |
| 5,793,603 A | 8/1998 | Lyman | | 6,306,509 B2 | 10/2001 | Takeuchi |
| 5,796,574 A | 8/1998 | Saito | | 6,308,405 B1 | 10/2001 | Takamatsu |
| 5,798,906 A | 8/1998 | Ando | | 6,310,756 B1 | 10/2001 | Miura |
| 5,812,367 A | 9/1998 | Kudoh | | 6,310,759 B2 | 10/2001 | Ishigaki |
| 5,837,630 A | 11/1998 | Owens | | 6,310,762 B1 | 10/2001 | Okamura |
| 5,840,087 A | 11/1998 | Gozdz | | 6,310,765 B1 | 10/2001 | Tanahashi |
| 5,846,675 A | 12/1998 | Sazhin | | 6,323,750 B1 | 11/2001 | Lampl |
| 5,847,919 A | 12/1998 | Shimizu | | 6,327,137 B1 | 12/2001 | Yamamoto |
| 5,847,920 A | 12/1998 | Li | | 6,335,857 B1 | 1/2002 | Takimoto |
| 5,849,431 A | 12/1998 | Kita | | 6,339,529 B1 | 1/2002 | Kasahara |
| 5,850,331 A | 12/1998 | Matsumoto | | 6,349,027 B1 | 2/2002 | Suhara |
| 5,859,761 A | 1/1999 | Aoki | | 6,359,769 B1 | 3/2002 | Mushiake |
| 5,862,035 A | 1/1999 | Farahmandi | | 6,368,365 B1 | 4/2002 | Chi |
| 5,875,092 A | 2/1999 | Jow | | 6,377,441 B1 | 4/2002 | Ohya |
| 5,877,935 A | 3/1999 | Sato | | 6,383,427 B2 | 5/2002 | Ishikawa |
| 5,879,836 A | 3/1999 | Ikeda | | 6,397,234 B1 | 5/2002 | O'Brien |
| 5,900,585 A | 5/1999 | Winfield | | 6,397,274 B1 | 5/2002 | Miller |
| 5,907,472 A | 5/1999 | Farahmandi | | 6,402,792 B1 * | 6/2002 | Hiratsuka et al. ............ 29/25.03 |
| 5,909,356 A | 6/1999 | Hirabayashi | | 6,403,257 B1 | 6/2002 | Christian |
| 5,914,019 A | 6/1999 | Dodgson | | 6,423,105 B1 | 7/2002 | Iijima |
| 5,914,852 A | 6/1999 | Hatanaka | | 6,424,514 B1 | 7/2002 | Boy |
| 5,916,485 A | 6/1999 | Besenhard | | 6,424,517 B1 | 7/2002 | Ikeda |
| 5,917,693 A | 6/1999 | Kono | | 6,426,865 B2 * | 7/2002 | Kasahara et al. ............ 361/512 |
| 5,920,455 A | 7/1999 | Shah | | 6,447,669 B1 | 9/2002 | Lain |
| 5,923,525 A | 7/1999 | Belyakov | | 6,452,782 B1 | 9/2002 | Otsuki |
| 5,926,357 A | 7/1999 | Elias | | 6,456,484 B1 | 9/2002 | Matsuoka |
| 5,926,361 A | 7/1999 | Alford | | 6,459,564 B1 | 10/2002 | Watanabe |
| 5,930,108 A | 7/1999 | Kurzwell | | 6,466,429 B1 | 10/2002 | Volfkovich |
| 5,949,637 A | 9/1999 | Iwaida | | 6,466,516 B1 | 10/2002 | O'Brien |
| 5,949,638 A | 9/1999 | Greenwood | | 6,491,789 B2 | 12/2002 | Niu |
| 5,955,215 A | 9/1999 | Kurzweil | | 6,493,210 B2 * | 12/2002 | Nonaka et al. ................ 361/502 |
| 5,956,225 A | 9/1999 | Okuyama | | 6,507,479 B2 * | 1/2003 | Saito et al. .................... 361/502 |
| 5,959,832 A | 9/1999 | Kobayashi | | 6,512,667 B2 | 1/2003 | Shiue |
| 5,966,414 A | 10/1999 | O'Brien | | 6,522,523 B2 | 2/2003 | Takatomi |
| 5,973,912 A | 10/1999 | Kibi | | 6,552,894 B2 | 4/2003 | Matsuoka |
| 6,022,436 A | 2/2000 | Koslow | | 6,558,832 B1 | 5/2003 | Bruck |
| 6,024,773 A | 2/2000 | Inuzuka | | 6,558,835 B1 | 5/2003 | Kurisu |
| 6,031,712 A | 2/2000 | Kurihara | | 6,585,915 B2 | 7/2003 | Shinozaki |
| 6,045,947 A | 4/2000 | Shindo | | 6,589,299 B2 | 7/2003 | Missling |
| 6,059,847 A | 5/2000 | Farahmandi | | 6,614,646 B2 | 9/2003 | Bogaki |
| 6,064,563 A | 5/2000 | Yamada | | 6,625,008 B2 | 9/2003 | Watanabe |
| 6,072,692 A | 6/2000 | Hiratsuka | | 6,627,252 B1 * | 9/2003 | Nanjundiah et al. ............ 427/79 |
| 6,094,338 A * | 7/2000 | Hirahara et al. ............... 361/502 | | 6,628,504 B2 | 9/2003 | Volfkovich |
| 6,094,788 A | 8/2000 | Farahmandi | | 6,631,071 B2 | 10/2003 | Kitagawa |
| 6,110,335 A | 8/2000 | Avarbz | | 6,638,385 B2 | 10/2003 | Ishikawa |
| 6,114,835 A | 9/2000 | Price | | 6,645,664 B2 | 11/2003 | Nakanishi |
| 6,127,060 A | 10/2000 | Read | | 6,665,169 B2 | 12/2003 | Tennent |
| 6,127,474 A | 10/2000 | Andelman | | 6,671,166 B1 | 12/2003 | Penneau |
| 6,134,760 A | 10/2000 | Mushiake | | 6,677,078 B2 | 1/2004 | Reise |
| 6,152,970 A | 11/2000 | Wei | | 6,697,249 B2 | 2/2004 | Maletin |
| 6,159,611 A | 12/2000 | Lee | | 6,708,757 B2 | 3/2004 | Hebel |
| 6,181,545 B1 | 1/2001 | Amatucci | | 6,714,402 B2 | 3/2004 | Kamath |
| 6,187,061 B1 | 2/2001 | Amatucci | | 6,721,168 B2 | 4/2004 | Takeuchi |
| 6,195,251 B1 | 2/2001 | Suhara | | 6,761,744 B1 | 7/2004 | Tsukamoto |
| 6,198,623 B1 | 3/2001 | Amatucci | | 6,768,056 B2 | 7/2004 | Fischer |
| 6,201,685 B1 | 3/2001 | Jerabek | | 6,795,297 B2 | 9/2004 | Iwaida |
| 6,201,686 B1 | 3/2001 | Hiratsuka | | 6,800,222 B1 | 10/2004 | Noguchi |
| 6,205,034 B1 | 3/2001 | Zayatz | | 6,804,108 B2 | 10/2004 | Nanjundiah |
| 6,207,251 B1 | 3/2001 | Balsimo | | 6,808,845 B1 | 10/2004 | Nonaka |
| 6,212,061 B1 | 4/2001 | Irwin | | 6,813,139 B2 | 11/2004 | Bendale |
| 6,212,062 B1 | 4/2001 | Day | | 6,821,877 B1 | 11/2004 | Han |
| 6,222,715 B1 | 4/2001 | Gruhn | | 6,831,826 B2 | 12/2004 | Iwaida |
| 6,222,720 B1 | 4/2001 | Aoki | | 6,841,591 B2 | 1/2005 | Vincent |
| 6,225,733 B1 | 5/2001 | Gadkaree | | 6,841,594 B2 | 1/2005 | Jones |
| 6,233,135 B1 | 5/2001 | Farahmandi | | 6,842,330 B2 | 1/2005 | Farahmandi |
| 6,236,560 B1 | 5/2001 | Ikeda | | 6,847,517 B2 | 1/2005 | Iwaida |
| 6,238,818 B1 | 5/2001 | Dalton | | 6,896,993 B2 | 5/2005 | Hozumi |
| 6,245,464 B1 | 6/2001 | Spillman | | 6,905,798 B2 | 6/2005 | Tsukuda |
| 6,246,568 B1 | 6/2001 | Nakao | | 6,906,911 B2 | 6/2005 | Ikeda |
| 6,256,190 B1 | 7/2001 | Wei | | 6,912,116 B2 | 6/2005 | Takahashi |
| 6,259,595 B1 | 7/2001 | Hebel | | 6,914,768 B2 | 7/2005 | Matsumoto |
| 6,262,360 B1 | 7/2001 | Michel | | 6,918,991 B2 | 7/2005 | Chickering |
| 6,262,879 B1 | 7/2001 | Nitta | | 6,922,330 B2 | 7/2005 | Nielsen |
| 6,270,707 B1 | 8/2001 | Hori | | 6,946,007 B2 | 9/2005 | Bendale |
| 6,282,081 B1 | 8/2001 | Takabayashi | | 6,962,745 B2 | 11/2005 | Penneau |
| 6,294,292 B1 | 9/2001 | Tsushima | | 6,967,412 B2 | 11/2005 | Standing |
| 6,301,092 B1 | 10/2001 | Hata | | 7,016,178 B2 | 3/2006 | Erhardt |

| Patent | Type | Date | Name |
|---|---|---|---|
| 7,018,568 | B2 | 3/2006 | Tierney |
| 7,061,749 | B2 | 6/2006 | Liu |
| 7,074,688 | B2 | 7/2006 | Kurihara |
| 7,085,112 | B2 | 8/2006 | Wilk |
| 7,090,946 | B2 | 8/2006 | Mitchell |
| 7,091,156 | B2 | 8/2006 | Hirahara |
| 7,095,604 | B2 | 8/2006 | Noguchi |
| 7,102,877 | B2 | 9/2006 | Mitchell |
| 7,138,711 | B2 | 11/2006 | Yee |
| 7,139,162 | B2 | 11/2006 | Michel |
| 7,141,230 | B2 | 11/2006 | Takeuchi |
| 7,147,744 | B2 | 12/2006 | Kaz |
| 7,169,509 | B2 | 1/2007 | Nobuta |
| 7,177,139 | B2 | 2/2007 | Oizumi |
| 7,184,190 | B2 | 2/2007 | McCabe |
| 7,198,865 | B2 | 4/2007 | Sloop |
| 7,199,997 | B1 | 4/2007 | Lipka |
| 7,203,053 | B2 | 4/2007 | Stockman |
| 7,203,056 | B2 | 4/2007 | Thrap |
| 7,206,190 | B2 | 4/2007 | Murakami |
| 7,227,737 | B2 | 6/2007 | Mitchell |
| 7,236,348 | B2 | 6/2007 | Asano |
| 7,245,478 | B2 | 7/2007 | Zhong |
| 7,256,099 | B2 | 8/2007 | Takahashi |
| 7,295,423 | B1 | 11/2007 | Mitchell |
| 7,307,830 | B2 | 12/2007 | Gallay |
| 7,342,770 | B2 | 3/2008 | Mitchell |
| 7,352,558 | B2 | 4/2008 | Zhong |
| 7,384,433 | B2 | 6/2008 | Mitchell |
| 7,384,686 | B2 | 6/2008 | Penneau |
| 7,440,258 | B2 | 10/2008 | Thrap |
| 7,443,650 | B2 | 10/2008 | Nedoshivin |
| 7,443,651 | B2 | 10/2008 | Ando |
| 7,492,574 | B2 | 2/2009 | Fresard |
| 7,508,651 | B2 | 3/2009 | Mitchell |
| 2002/0122985 | A1 | 9/2002 | Sato |
| 2002/0123648 | A1 | 9/2002 | Hasegawa |
| 2002/0136948 | A1 | 9/2002 | Missling |
| 2002/0138958 | A1 | 10/2002 | Nonaka |
| 2002/0163773 | A1 | 11/2002 | Niiori |
| 2003/0113636 | A1 | 6/2003 | Sano |
| 2003/0161781 | A1 | 8/2003 | Cabasso |
| 2003/0169558 | A1 | 9/2003 | Olson |
| 2003/0175588 | A1 | 9/2003 | Zhang |
| 2004/0027782 | A1 | 2/2004 | Erhardt |
| 2004/0101755 | A1 | 5/2004 | Huang |
| 2005/0064289 | A1 | 3/2005 | Suzuki |
| 2005/0186473 | A1 | 8/2005 | Mitchell |
| 2005/0250011 | A1 | 11/2005 | Mitchell |
| 2005/0266298 | A1 | 12/2005 | Mitchell |
| 2005/0266990 | A1 | 12/2005 | Iwasaki |
| 2005/0271798 | A1 | 12/2005 | Zhong |
| 2006/0035785 | A1 | 2/2006 | Tanaka |
| 2006/0039100 | A1 | 2/2006 | Asano |
| 2006/0054277 | A1 | 3/2006 | Byun |
| 2006/0105624 | A1 | 5/2006 | Yoshikane |
| 2006/0109608 | A1 | 5/2006 | Zhong |
| 2006/0114643 | A1 | 6/2006 | Mitchell |
| 2006/0133012 | A1 | 6/2006 | Zhong |
| 2006/0137158 | A1 | 6/2006 | Zou |
| 2006/0146475 | A1 | 7/2006 | Zhong |
| 2006/0147712 | A1 | 7/2006 | Mitchell |
| 2006/0148112 | A1 | 7/2006 | Mitchell |
| 2006/0148191 | A1 | 7/2006 | Mitchell |
| 2006/0188784 | A1 | 8/2006 | Sudoh |
| 2006/0246343 | A1 | 11/2006 | Mitchell |
| 2007/0026317 | A1 | 2/2007 | Mitchell |
| 2007/0053140 | A1 | 3/2007 | Soliz |
| 2007/0054559 | A1 | 3/2007 | Thrap |
| 2007/0122698 | A1 | 5/2007 | Mitchell |
| 2007/0146966 | A1 | 6/2007 | Zhong |
| 2007/0146967 | A1 | 6/2007 | Xi |
| 2007/0177334 | A1 | 8/2007 | Thrap |
| 2007/0184711 | A1 | 8/2007 | Thrap |
| 2007/0190424 | A1 | 8/2007 | Mitchell |
| 2007/0201185 | A1 | 8/2007 | Yoshio |
| 2007/0257394 | A1 | 11/2007 | Borkenhagen |
| 2007/0258189 | A1 | 11/2007 | Tano |
| 2007/0258193 | A1 | 11/2007 | Zhong |
| 2008/0013253 | A1 | 1/2008 | Thrap |
| 2008/0014139 | A1 | 1/2008 | Zhong |
| 2008/0016664 | A1 | 1/2008 | Mitchell |
| 2008/0089006 | A1 | 4/2008 | Zhong |
| 2008/0089013 | A1 | 4/2008 | Zhong |
| 2008/0092808 | A1 | 4/2008 | Mitchell |
| 2008/0102371 | A1 | 5/2008 | Mitchell |
| 2008/0117564 | A1 | 5/2008 | Zhong |
| 2008/0117565 | A1 | 5/2008 | Zhong |
| 2008/0201925 | A1 | 8/2008 | Zhong |
| 2008/0204973 | A1 | 8/2008 | Zhong |
| 2008/0206446 | A1 | 8/2008 | Mitchell |
| 2008/0236742 | A1 | 10/2008 | Mitchell |
| 2008/0266752 | A1 | 10/2008 | Thrap |
| 2008/0266753 | A1 | 10/2008 | Mitchell |

FOREIGN PATENT DOCUMENTS

| | | |
|---|---|---|
| CA | 849697 | 8/1970 |
| EP | 0112923 | 6/1983 |
| EP | 0134706 | 8/1984 |
| EP | 0207167 | 12/1985 |
| EP | 0449145 | 3/1991 |
| EP | 0443825 | 8/1991 |
| EP | 0617441 | 9/1994 |
| EP | 0680061 | 3/1995 |
| EP | 0660345 | 6/1995 |
| EP | 0917166 | 5/1999 |
| EP | 0989571 | 3/2000 |
| EP | 1009058 | 6/2000 |
| EP | 1033729 | 9/2000 |
| EP | 1126536 | 8/2001 |
| JP | 5599714 | 7/1980 |
| JP | 594114 | 1/1984 |
| JP | 59105312 | 6/1984 |
| JP | 63268221 | 4/1988 |
| JP | 63261817 | 10/1988 |
| JP | 64001220 | 1/1989 |
| JP | 64001222 | 1/1989 |
| JP | 1246812 | 2/1989 |
| JP | 6446913 | 2/1989 |
| JP | 153524 | 3/1989 |
| JP | 1222425 | 5/1989 |
| JP | 1201908 | 8/1989 |
| JP | 1304719 | 8/1989 |
| JP | 01241811 | 9/1989 |
| JP | 1298712 | 12/1989 |
| JP | 256805 | 2/1990 |
| JP | 256913 | 2/1990 |
| JP | 265114 | 3/1990 |
| JP | 266917 | 3/1990 |
| JP | 278213 | 3/1990 |
| JP | 21104 | 5/1990 |
| JP | 2177525 | 10/1990 |
| JP | 2248025 | 10/1990 |
| JP | 2297915 | 12/1990 |
| JP | 34510 | 1/1991 |
| JP | 3038815 | 2/1991 |
| JP | 3132009 | 6/1991 |
| JP | 3141629 | 6/1991 |
| JP | 3289116 | 12/1991 |
| JP | 465814 | 3/1992 |
| JP | 474405 | 3/1992 |
| JP | 499305 | 3/1992 |
| JP | 4206914 | 7/1992 |
| JP | 4206916 | 7/1992 |
| JP | 4162510 | 8/1992 |
| JP | 4336409 | 11/1992 |
| JP | 513284 | 1/1993 |
| JP | 04067610 | 3/1993 |
| JP | 04088619 | 3/1993 |
| JP | 555085 | 5/1993 |
| JP | 05129020 | 5/1993 |
| JP | 5217803 | 8/1993 |
| JP | 5258996 | 8/1993 |
| JP | 5299295 | 11/1993 |
| JP | 6275469 | 9/1994 |
| JP | 08096810 | 4/1996 |
| JP | 11-186111 | 7/1997 |
| JP | 09183604 | 7/1997 |

| | | |
|---|---|---|
| JP | 09298129 | 11/1997 |
| JP | 10244380 | 9/1998 |
| JP | 10287412 | 10/1998 |
| JP | 2000-200737 | 7/2000 |
| JP | 2004 002105 | 1/2004 |
| JP | 2004083337 A | 3/2004 |
| JP | 2004296181 | 10/2004 |
| KR | 2005-49381 | 10/2004 |
| KR | 2004-84743 | 5/2005 |
| WO | 9309552 | 5/1993 |
| WO | WO2003/041097 | 5/2003 |
| WO | WO2003/102982 | 12/2003 |
| WO | WO2005/008807 | 1/2005 |
| WO | WO2006001847 | 1/2006 |
| WO | WO2006135495 | 12/2006 |
| WO | 2007062126 | 5/2007 |
| WO | 2007062143 | 5/2007 |
| WO | 2008049037 | 4/2008 |
| WO | 2008049040 | 4/2008 |
| WO | 2008106533 | 9/2008 |
| WO | WO2008/106529 | 9/2008 |
| WO | WO2008/127790 | 10/2008 |

OTHER PUBLICATIONS

U.S. Appl. No. 12/392,069, filed Feb. 24, 2009.
U.S. Appl. No. 12/372,705, filed Feb. 17, 2009.
U.S. Appl. No. 12/445,294, filed Apr. 11, 2009.
U.S. Appl. No. 12/445,295, filed Apr. 11, 2009.
Technical Notes. "The Charcoal Cloth", (1987).
Cheng, et al.; "Preparation of Carbon Fibre Reinforced Aluminum Via Ultrasonic Liquid Infiltration Technique", Materials Science and Technology, 9, pp. 609-614 (Jul. 1993).
Foster, et al.; "New Highly Conductive Inorganic Electrolytes", J. Electrochem. Soc., pp. 2682-2686, (Nov. 1998).
Dietz, Steven DR. et al., "Optimization of Sugar Derived Carbons," TDA Research, Inc., Dec. 2005, pp. 1-33.
Timcal Graphite & Carbon "TIMREX Graphite ENSACO Carbon Black: Carbon Additives for Polymer Compounds." TIMICAL, Ltd., CH-Bodio, 2004. pp. 1-24.
C. J. Farahmandi, "A Comparison of Electrochemical Capacitors Using Organic and Aqueous Electrolytic Solutions for Electric Vehicle Applications." Proceedings of the Third International Seminar on Double Layer Capacitors and Similar Energy Storage Devices, Florida Educational Seminars, Boca Raton, Florida, Dec. 6, 1993.
Fujii; "KYNOL Novoloid Fibers", Informational Brochure, (1990).
Farahmandi et.al.; "Optimization of Carbon Fibers Used in Electrochemical Capacitors for Electric Vehicle Applications"; Proceedings of the 36th Power Sources Conference, US Army Research Laboratory, Cherry Hill, NJ, pp. 23-26; Jun. 6, 1994.
Farahmandi et.al.; "Bipolar Electrochemical Capacitors Based on Organic Electrolytes for Electric Vehicle Applications"; Proceedings of the Fourth International Seminar on Double Layer Capacitors and Similar Energy Storage Devices, Florida Educational Seminars, Boca Raton, Florida, Dec. 12, 1994.
U.S. Appl. No. 11/016,411, filed Oct. 14, 2005.
U.S. Appl. No. 11/679,783, filed Feb. 27, 2007.

* cited by examiner

ELECTRICAL ENERGY STORAGE DEVICES WITH SEPARATOR BETWEEN ELECTRODES AND METHODS FOR FABRICATING THE DEVICES

CROSS-REFERENCE TO RELATED APPLICATION

This application is a divisional of U.S. application Ser. No. 11/016,411 filed on Dec. 17, 2004, titled "Electrical Energy Storage Devices with Separator Between Electrodes and Methods for Fabricating the Devices", which is a continuation-in-part of U.S. application Ser. No. 10/900,825, filed on Jul. 28, 2004, titled "Electrode Impregnation and Bonding," which claims the benefit of U.S. application No. 60/512,802 filed Oct. 20, 2003 and U.S. application No. 60/502,376 filed Sep. 12, 2003 each of which is hereby incorporated herein by reference for all purposes.

FIELD OF THE INVENTION

The present invention relates generally to methods for fabricating electrical energy storage devices using a separator, such as electrochemical double layer capacitors, and to energy storage devices fabricated using these methods.

BACKGROUND

Electrodes are widely used in many devices that store electrical energy, including primary (non-rechargeable) battery cells, secondary battery cells, fuel cells, and capacitors. In some applications, it is necessary or desirable to keep the electrodes separated so that the electrodes do not come into direct electrical contact with each other, while at the same time allowing some chemical, electrical, or other kind of interaction between the electrodes. One such application that uses electrodes is in double layer capacitors, also known as electrochemical capacitors, supercapacitors, and ultracapacitors.

Double layer capacitors employ, as their energy storage elements, electrodes immersed in an electrolytic solution (electrolyte). A porous separator impregnated with the electrolyte ensures that the electrodes do not come in contact with each other. A double layer of charges is formed at each interface between the solid electrodes and the electrolyte. Double layer capacitors owe their descriptive name to these layers.

When electric potential is applied between a pair of electrodes, ions that exist within the electrolyte are attracted to the surfaces of the electrodes, and migrate towards the electrodes. A layer of oppositely-charged ions is thus created and maintained near each electrode surface. The electrical energy is stored in the charge separation layers between the ionic layers and the charge layers of the corresponding electrode surfaces. The charge separation layers behave essentially as capacitors.

In comparison to conventional capacitors, double layer capacitors have high capacitance in relation to their volume and weight. There are two main reasons for this volumetric and weight efficiency. First, the width of the charge separation layers is very small, on the order of nanometers. Second, the electrodes may be made from a porous material, having very large effective surface area per unit volume, i.e., very large normalized effective surface area. Because capacitance is directly proportional to the electrode area and inversely proportional to the width of the charge separation layer, the combined effect of the narrow charge separation layer and large surface area results in capacitance that is very high in comparison to that of conventional capacitors of similar size. High capacitance enables double layer capacitors to receive, store, and release large supplies of electrical energy.

Another important performance parameter of a capacitor is its internal resistance, also known as equivalent series resistance or "ESR." Frequency response of a capacitor depends on the characteristic time constant of the capacitor, which is essentially a product of the capacitance and the capacitor's equivalent series resistance, or "RC." To put it differently, equivalent series resistance limits both charge and discharge rates of a capacitor, because the resistance limits the current that flows into or out of the capacitor. Maximizing the charge and discharge rates is important in many applications. In automotive applications, for example, a capacitor used as the energy storage element powering a vehicle's engine has to be able to provide high instantaneous power during acceleration, and to receive bursts of power produced by regenerative braking. In internal combustion vehicles, the capacitor periodically powers a vehicle's starter, also requiring high power output in relation to the size of the capacitor.

The internal resistance also creates heat during both charge and discharge cycles. Heat causes mechanical stresses and speeds up various chemical reactions, thereby accelerating capacitor aging. Moreover, the energy converted into heat is lost, decreasing the efficiency of the capacitor. It is therefore desirable to reduce internal resistance of capacitors.

Active materials used for electrode construction—activated carbon, for example—may have limited specific conductance. Thus, large contact area may be desired to minimize the interfacial contact resistance between the electrode and its terminal. The active material may also be too brittle or otherwise unsuitable for directly connecting to capacitor terminals. Additionally, the material may have relatively low tensile strength, needing mechanical support in some applications. For these reasons, electrodes often incorporate current collectors.

A current collector is typically a sheet of conductive material to which the active electrode material is attached. Aluminum foil is commonly used as the current collector element of an electrode. In one electrode fabrication process, for example, a film that includes activated carbon powder is produced, and then attached to a thin aluminum foil using an adhesive layer. To improve the quality of the interfacial bond between the film of active electrode material and the current collector, the combination of the film and the current collector is processed in a pressure laminator, for example, a calender or another nip. Pressure lamination increases the bonding forces between the film and the current collector, and reduces the equivalent series resistance of the energy storage device that employs the electrode.

As has already been mentioned, a porous separator keeps the electrodes of a double layer capacitor from coming into direct electrical contact with each other. In one double layer capacitor fabrication process, electrodes are made using techniques known in the art, with each electrode having an active electrode layer attached to a current collector. The separator is then sandwiched between two electrodes so that the separator is in contact with the layers of active electrode material of the two electrodes. The electrode-separator-electrode assembly may then be jelly-rolled, equipped with a pair of terminals, and placed in a can or another container holding electrolyte.

The manufacture of electrodes before attachment to separator may not be advantageous. For example, an active electrode layer may be damaged in the process of calendering and laminating it to a current collector. Similarly, when current collector is deposited on an active electrode layer using certain metallization techniques such as arc spraying, the active electrode layer may be damaged from the physical forces and high temperatures created by the metallization process. To avoid such damage, appropriate support backing may need to be supplied to one surface of the active electrode layer prior to attaching the current collector to the opposite surface of the layer.

These and other disadvantages are addressed by embodiments of the present invention, which are described in the following disclosure.

SUMMARY

The present invention is directed to methods, electrode assemblies, and energy storage devices that address disadvantages of the prior art. An exemplary embodiment of the invention herein disclosed is a method of manufacturing an electrode assembly. According to the method, a first surface of a first film of active electrode material is attached to a first surface of a porous separator, and thereafter a second surface of the first film is metallized to obtain a first current collector. Similarly, a first surface of a second film of active electrode material is attached to a second surface of the separator, and then a second surface of the second film is metallized to obtain a second current collector. In selected aspects of the inventive methods, the films may be attached to the separator using adhesive layers, for example, topical adhesive coatings applied in selected areas of the separator surfaces, and by laminating the films to the separator using a nip. The films may also be formed directly on the separator, for example, by coating the separator surfaces with a solvent-based paste of an active electrode material, and then allowing the paste to dry or baking out the solvent from the paste at an elevated temperature. In one embodiment, a film formed by a dry fibrillization process is provided such that solvent need not be removed during a backing process. In selected aspects, the steps of metallizing the second surface of the first film and metallizing the second surface of the second film may include spraying the second surfaces of the first and second films with molten metal, using, for example, arc spraying, plasma spraying, high velocity oxygen fuel (HVOF) thermal spraying, and flame spraying techniques. In other selected aspects, metallization may also be performed using vapor deposition techniques, adhesive binder, and/or by laminating the current collectors to the films. In another exemplary embodiment, the invention herein disclosed is an electrochemical double layer capacitor that includes a first layer of active electrode material comprising a first surface and a second surface, a second layer of active electrode material comprising a third surface and a fourth surface, and a porous separator impregnated with electrolyte. The separator is disposed between the first layer and the second layer so as to adjoin and be attached to the first surface and the third surface. A first current collector is attached to the second surface after the separator is attached to the first surface. Similarly, a second current collector is attached to the fourth surface after the separator is attached to the third surface. In one embodiment, a method of manufacturing a double-layer capacitor electrode comprises providing a separator; providing a first film of active electrode material; and attaching a first surface of the first film of active electrode material to a first surface of the separator. The method may also comprise providing a second film of active electrode material; and attaching a first surface of the second film of active electrode material to a second surface of the separator. The method may further comprise a step of providing a metal onto a second surface of the first film and or the second film. The metal may be provided as a spray. The metal may be provided as a molten metal. The metal may be provided as a foil. The foil may comprise aluminum. The separator may comprise polyethylene. The separator may comprise polypropylene. The separator may comprise paper. The first and second electrode films may be provided as dry fibrillized particles. The dry fibrillized particles may be provided in film form. The dry fibrillized particles may comprise dry carbon particles and dry binder particles. The first and second electrode films may comprise dry adhesive particles. The first and second electrode films may be provided as extruded films. The first and second electrode films may be attached by coating. The step of attaching may be effectuated by an adhesive. The adhesive may comprise adhesive particles. The step of attaching the first surface of the first film may comprise laminating the first film to the separator; and the step of attaching the first surface of the second film may comprise laminating the second film to the separator. In one embodiment, a double layer capacitor product may comprise a first layer of electrode material comprising a first surface and a second surface; a second layer of electrode material comprising a third surface and a fourth surface; a porous separator disposed between the first layer and the second layer so as to adjoin and be attached to the first surface and the third surface; a first current collector attached on the second surface; and a second current collector attached on the fourth surface; wherein the separator is attached to the first surface before the first current collector is attached to the second surface; and wherein the separator is attached to the third surface before the second current collector is attached to the fourth surface.

These and other features and aspects of the present invention will be better understood with reference to the following description, drawings, and appended claims.

FIGURES

DESCRIPTION

Figure 1:
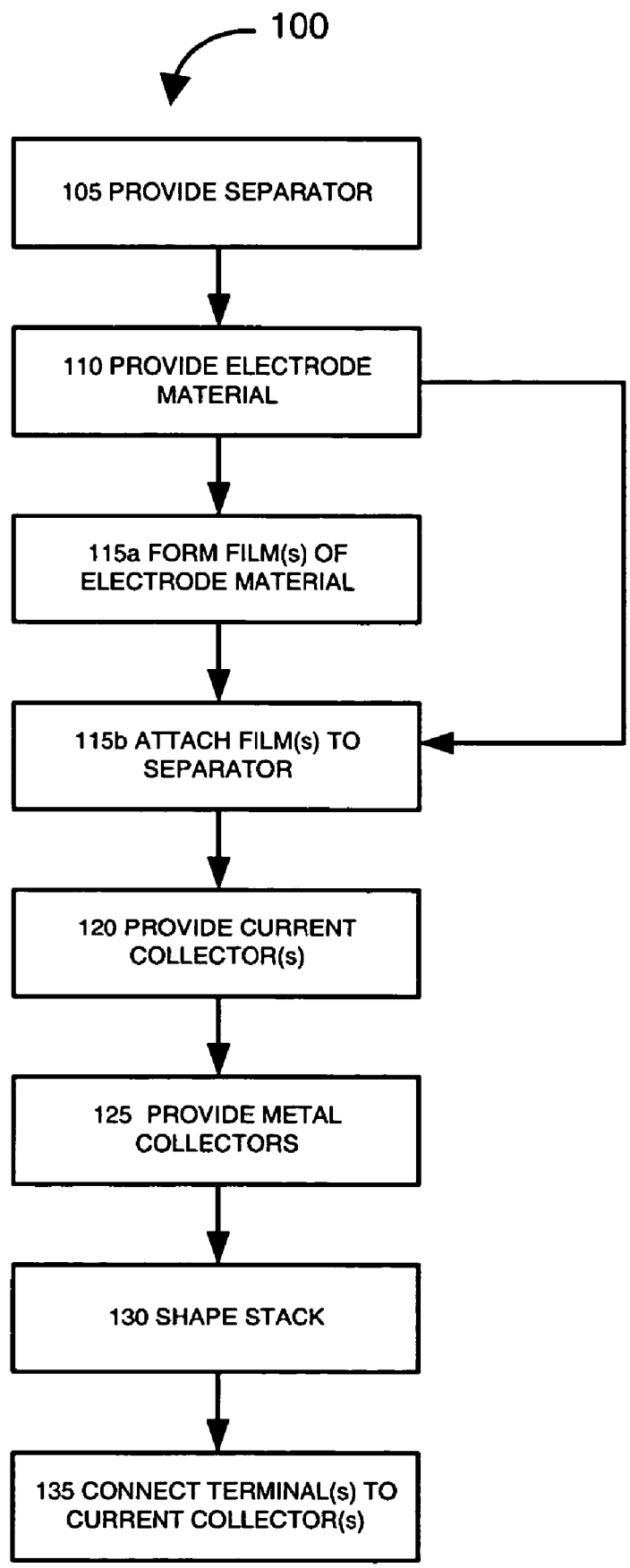
FIG. 1 illustrates selected steps of a process of manufacturing an electrode assembly of a double layer capacitor, in accordance with an embodiment of the present invention.

Reference will now be made in detail to several embodiments of the invention that are illustrated in the accompanying drawings. Wherever practicable, same or similar reference numerals are used in the drawings and the description to refer to the same or like parts or steps. The drawings are in simplified form and not to precise scale. For purposes of convenience and clarity only, directional terms, such as top, bottom, left, right, up, down, over, above, below, beneath, rear, and front may be used with respect to the accompanying drawings. These and similar directional terms should not be construed to limit the scope of the invention in any manner. The words "embodiment" and "variant" refer to particular apparatus or process, and not necessarily to the same apparatus or process. Thus, "one embodiment" (or a similar expression) used in one place or context can refer to a particular apparatus or process; the same or a similar expression in a different place can refer to a different apparatus or process. The expression "alternative embodiment" and similar phrases are used to indicate one of a number of different possible embodiments. The number of potential embodiments is not necessarily limited to two or any other quantity. The expression "active electrode material" and similar phrases signify material that enhances the function of the electrode beyond simply providing a contact or reactive area approximately the size of the visible external surface of the electrode. In a double layer capacitor electrode, for example, a film of active electrode material includes particles with high porosity, so that the surface area of the electrode exposed to an electrolyte (in which the electrode is immersed) is increased well beyond the area of the visible external surface; in effect, the surface area exposed to the electrolyte becomes a function of the volume of the film made from the active electrode material. Note also that the meaning of the word "film" is similar to the meaning of the words "layer" and "sheet"; "film" does not necessarily signify a particular thickness.

Referring more particularly to the drawings, FIG. 1 illustrates selected steps of a process 100 of manufacturing electrode assemblies of a double layer capacitor. Although the process steps are described serially, certain steps can be performed in conjunction or in parallel, asynchronously or synchronously, in a pipelined manner, or otherwise. There is no particular requirement that all steps be performed and/or that they be performed in the same order in which this description lists them, except where explicitly so indicated, otherwise made clear from the context, or inherently required. Additionally, although not shown, one or more other steps could be added to the process. A high level overview of an embodiment of a process 100 is provided immediately below; more detailed explanations of the steps of the process 100 and variations of the steps are provided following the overview.

Figure 2:
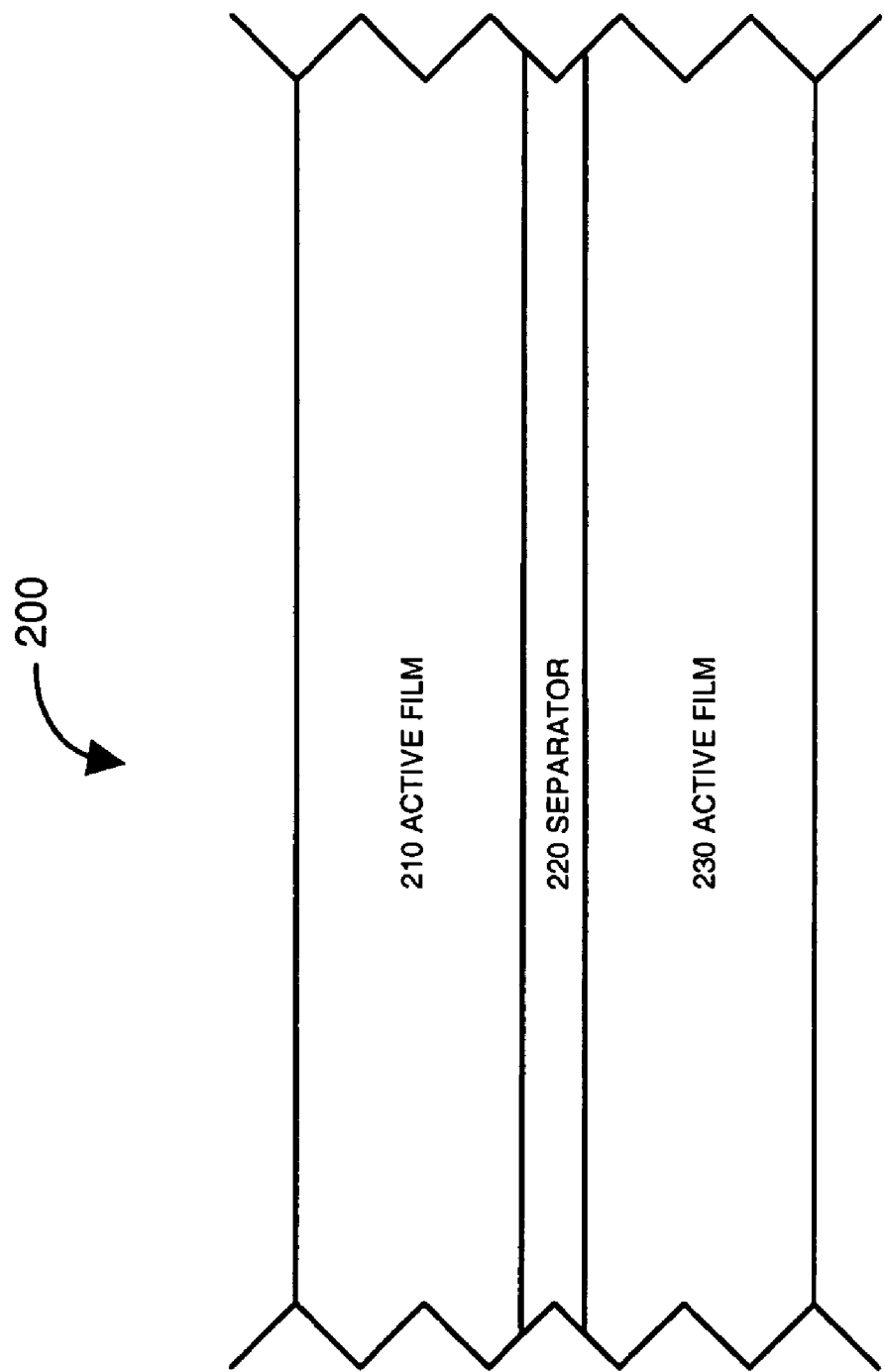
FIG. 2 is a high level illustration of cross-section of a stack of two films of active electrode material attached to a separator.

At step 105, a separator sheet (or simply "separator") is provided. At step 110, active electrode material is provided. In step 115b, active electrode material is disposed onto the separator. In one embodiment, active electrode material is formed into a first film and a second film; the films are then deposited or otherwise attached to the opposite surfaces of the separator sheet at step 115b. The steps 115a and 115b may be combined. FIG. 2 illustrates, in a high level schematic diagram manner, a cross-section of a combination (stack) 200 of two films of active electrode material 210 and 230 attached to a separator 220, after the step 115b is performed.

At step 120, two current collectors are provided. At step 125, which is performed after the step 115b, the current collectors are attached to the surfaces of the active electrode material films that are opposite the surfaces of the films that are adjacent to the separator. At step 130, the combination of the separator, films of active electrode material, and current collectors is formed into a shape appropriate for use in a double layer capacitor. At step 135, terminals are connected to the current collectors.

We now turn to a more detailed description of the individual steps of the process 100.

The separator provided in step 105 is made from a porous material that allows an electrolyte to pass through its pores or holes. At the same time, the separator material is capable of preventing direct electrical contact between the electrodes disposed on each side of the separator. In one embodiment, the separators comprise paper. In other embodiments, separators may comprise cellulose, glass, polyethylene, polyphenylene sulfide, rayon, polypropylene, polyetheretherketone, other polymers, as well as compositions, laminates, and overlays of these materials. Furthermore, sheets formed using woven and unwoven fibers of these and other substances can also be used in making the separators. In one particular embodiment, the separator is made from TF3045 paper available from Nippon Kodoshi Corporation of Japan.

Separator thickness may vary widely, for example, between about 1 and 50 microns. In one particular embodiment, separator thickness is about 20 microns. Density, porosity, and electrolyte absorbency of the separator material may also vary within broad limits. In certain embodiments, the density varies between about 0.3 and 0.5 grams per cubic centimeter, porosity varies between about 20 and 80 percent, and absorbency with respect to the specific electrolyte used in the double layer capacitor built with the separator varies between about 10 and 80 millimeters per 10 minutes.

As will be discussed below, the separator may be subjected to high temperatures in the course of capacitor fabrication. Therefore, thermal stability and ability to withstand high temperatures are other desirable attributes of separator material. In one embodiment, for example, separator material can withstand exposure to 250 degrees Celsius for five minutes without decomposition significant enough to render the separator unusable in a double layer capacitor.

Preferably, the pores of the separator pores are dimensioned so as to prevent penetration of active electrode material from one side of a separator to the other side. At the same time, the pore openings of each layer allow ionic flow through the separator. In example, polypropylene typically has pore openings between about 0.04 and 0.12 microns. Polyethylene pore sizes are generally smaller than about 0.1 micron. Thus, both materials can be used to prevent penetration of constituent materials of an active electrode material, which can include particles with diameters of about 8-10 microns. Each of these materials has pores that are sufficiently large to allow flow of ions of a typical electrolyte of interest in double layer capacitor applications. In some applications, polyethylene exhibits lower resistance to the flow of ions than polypropylene, because of polyethylene's relatively higher porosity. Consequently, given the same separator thickness, $R_{SEP}$ (the component of the equivalent series resistance due to the separator) may be lower for polyethylene than for polypropylene.

Films of active electrode material (which are formed in step 115a from active electrode material provided in step 110) can be made using a number of different techniques. One method of manufacture utilizes an extrusion process. Polymers act as a matrix for the active electrode material within the film. Polymers that may be used in electrode embodiments include, without limitation, polytetraflouroethylene (PTFE or Teflon®), polypropylene, polyethylene, co-polymers, and various polymer blends. In one embodiment, a mixture of polymer binder and active electrode material is introduced into an extruder, together with a solvent, to fibrillate the blended material, creating a doughlike film. In one embodiment, the proportions of the mixture and the solvent are about 80/20 by weight. The dough-like film may be calendered one or more times to produce a film of active electrode material having desired thickness and density. Finally, the dough-like film is baked or otherwise dried to reduce the residual solvent within the film to an acceptable level.

According to a preferred embodiment of manufacturing films of active electrode material, dry activated carbon particles are dry blended or otherwise mixed together with a dry polymer and dry conduction promoter particles (for example, dry conductive carbon particles) to form a dry powder material. The dry powder material is dry fibrillized (fibrillated) using a non-lubricated high-shear technique. Various dry particle processes and embodiments, such as self-supporting active electrode material films, are described in commonly assigned U.S. patent application Ser. No. 10/817,701, which is incorporated herein by reference in its entirety, including all figures, tables, claims, and additional subject matter incorporated by reference therein. The shear forces that arise during the dry fibrillation process physically stretch the dry polymer particles, causing the polymer to form a network of fibers that bind the polymer to the conduction promoter and to the active particles, e.g., to the conductive and activated carbon particles. The dry fibrillized material is fed into one or more high-pressure nips, such as roll mills, calenders, belt-presses or flat plate presses.

In certain exemplary embodiments, the powders and proportions used are as follows: 85-93 percent by weight of activated carbon, 3-8 percent by weight of PTFE, and 2-10 percent by weight of conductive carbon (graphite, acting as a promoter of electrical conduction). More specific exemplary embodiments contain 85-90 percent of activated carbon, 5-8 percent of PTFE, and 2-10 percent of conductive carbon. Suitable activated carbon powders are available from a variety of sources, including Nuchar® powders sold by Westvaco Corporation of Stamford, Conn. Other combinations of powders and proportions are also within the scope of the present invention.

It is identified, a certain amount of impurity, for example, moisture, may be absorbed during manufacture from a surrounding environment. Additionally, particles used with embodiments and processes disclosed herein may, prior to being provided by particle manufacturers as particles, have themselves been preprocessed with additives and, thus, contain one or more pre-process residues. For these reasons, one or more of the embodiments and processes disclosed herein may utilize a drying step prior to a final electrolyte impregnation step so as to remove or reduce the aforementioned pre-process moisture, residues, and impurities, and as well, if they are used, processing solvents. additives and the like. It is identified that even after one or more drying steps, trace amounts of the aforementioned pre-process residues and impurities may be present in the active electrode material and the electrode film made from the material.

It should be noted that the references to dry-blending, dry powders, other dry processes, and dry materials used in the manufacture of the active electrode material films does not exclude the use of electrolyte in the double layer capacitors.

In one embodiment, films of the active electrode material may be formed directly on separator surfaces, in effect combining steps 115a and 115b. For example, active electrode material can be applied onto the sides of a porous separator. In one embodiment, rather than being first formed into a film of dry active material, the dry active material can be deposited as a dry fibrillized material directly onto a separator, for example, as by a scatter coater apparatus. The scatter coated active electrode material and separator may be subsequently calendered together.

In one embodiment, the active electrode material may be formed into a paste, which in turn can be coated onto a separator. The paste may applied after portions of the separator are covered with a mask to prevent paste application in selected areas, for example, areas proximate the separator perimeter. The paste is allowed to dry at room temperature, or the separator with the applied paste is baked in an oven to remove solvent, thereby obtaining the films of active electrode material on the separator surfaces. Applying a paste onto separator surfaces may fill irregularities of the surfaces, such as small depressions, with the paste, thereby improving volumetric efficiency and decreasing internal resistance of a double layer capacitor.

In one embodiment, active electrode films may comprise as a constituent material adhesive included within each film. In one embodiment adhesive may be included on the interface between the separator and the film with adhesive applied to the separator surface, active electrode film surface, or to both surfaces. It should be noted that it is desired that use of adhesive should not completely block ionic flow through the separator.

A separator and active electrode film may be processed in a laminator, such as a nip or a calender, to enhance the bond between the film and the separator. In one embodiment, films are attached to both sides of a separator to obtain a film-separator-film combination (such as a stack 200 illustrated in FIG. 2). The entire combination may then be calendered as a unit. As described below, calendering may also be performed after metallization of the active electrode films. Calendering may be performed at ambient temperature, or at an elevated temperature, for example, by heating calendar rolls to a predetermined temperature.

Calender processing may also densify the active electrode material films, as is described in commonly assigned U.S. patent application Ser. No. 10/900,824, This application is hereby incorporated by reference in its entirety, including all figures, tables, claims, and additional subject matter incorporated by reference therein.

Note that both films of active electrode material can be attached to the separator substantially simultaneously; alternatively, the films can be attached to the separator one at a time.

The current collectors provided in step 120 may be made of a sheet of conductive material, such as metal foil, screen, or mesh. In one electrode embodiment, the current collector is a sheet of aluminum foil approximately 40 microns thick. In alternative embodiments, the thickness of the foil is between about 20 and about 100 microns. In other, more specific embodiments, the thickness of the aluminum foil is between about 30 and about 50 microns.

In some embodiments, the current collector may be pretreated to enhance its adhesion properties. Treatment of the current collector may include mechanical roughing, chemical pitting, and/or use of a surface activation treatment such as corona discharge, active plasma, ultraviolet, laser, or high frequency treatment methods known to persons skilled in the art.

In one embodiment, a current collector can be attached to an active electrode film using adhesive binder. In one embodiment, the adhesive binder may comprise particles. In one embodiment, the adhesive may be deposited as dry adhesive particles, for example, as by a scatter coat process. In one embodiment, the adhesive may be deposited onto the current collector surface, to the active electrode film surface, or to both surfaces. In one embodiment, the adhesive may be premixed or added as a constituent material as part of a mixture used to form the active electrode film.

In one embodiment, adhesive binder may be coated onto the current collector surface, to the active electrode film surface, or to both surfaces. The coating can be obtained by dissolving an adhesive in a processing additive, such as an organic solvent, aqueous solvent, or a blend of aqueous and organic solvents. In one embodiment, the resulting solution exhibits a slurry-like property. In some embodiments, an electrical conduction enhancer may be added to the binder solution. In some embodiments, wet adhesive binder may be coated onto a dry active electrode film by spraying with compressed air. In other embodiments, wet adhesive may be coated using a doctor blade or a slot die. In still other embodiments, wet adhesive may be coated using a gravure coating process. Wet adhesive can also be applied using other techniques known to a person skilled in the relevant art, including reverse roll coating, knife over roll coating (gap coating), metering rod coating, curtain coating, air knife coating, and partial immersion coating.

In certain exemplary embodiments, solvents used to produce wet adhesive binder may include water, isopropyl alcohol (IPA), and ammonia solutions; the conduction enhancer may include graphite or conductive carbon powder; and the binder may include a thermoplastic powder material. In various embodiments, the proportions by weight of the constituent components of the wet adhesive binder are as follows: between 5 and 20 percent of conductive carbon, between 7 and 40 percent of thermoplastic, and between 40 and 85 percent of solvent. In more specific process embodiments, the proportions are as follows: 7-11 percent of conductive carbon, 12-25 percent of thermoplastic, and 65-80 percent of solvent. In a still more specific process embodiment, the proportions are: about 10 percent graphite, 20 percent thermoplastic, and 70 percent binder.

Figure 3:
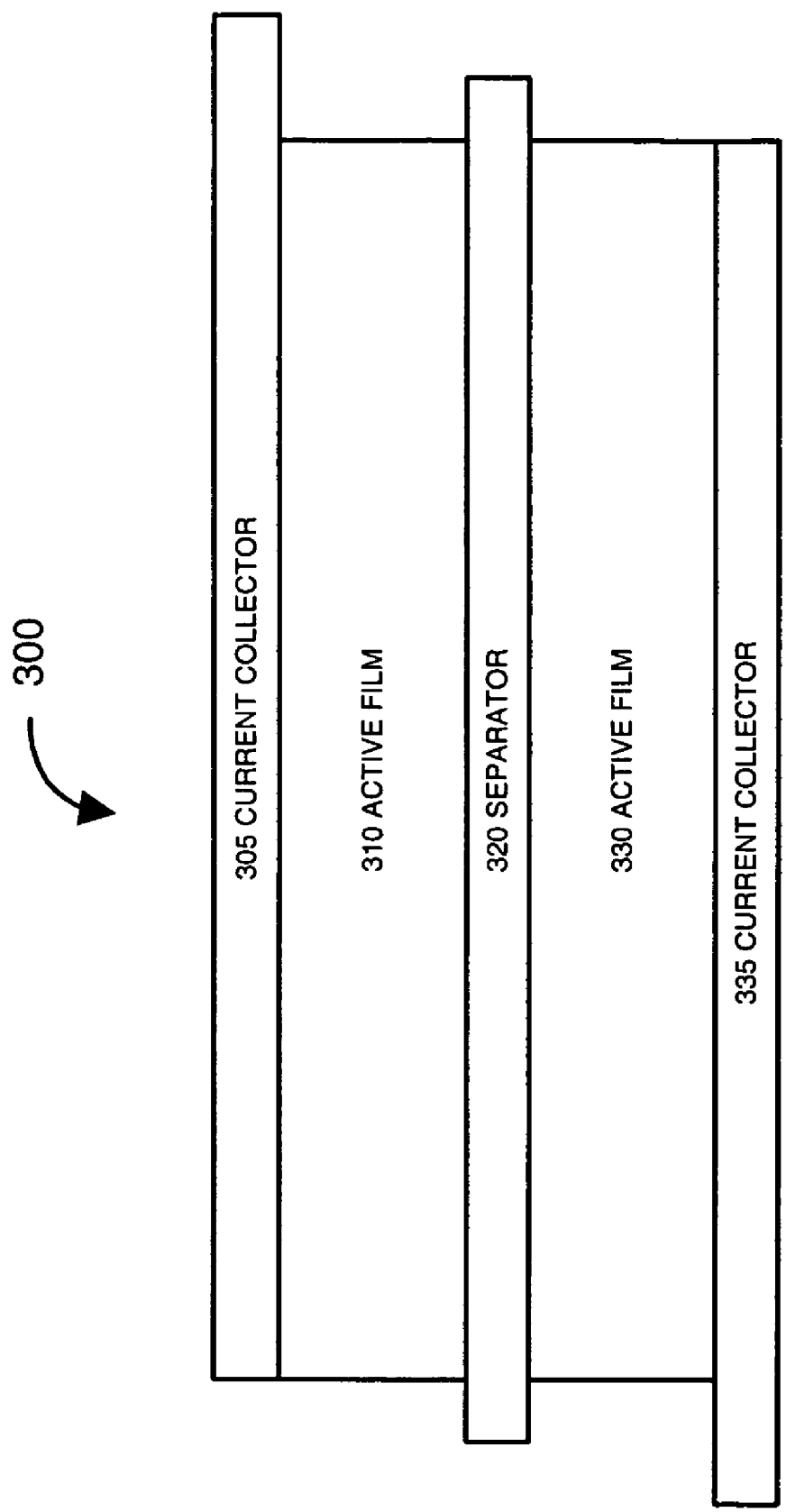
FIG. 3 is a high level illustration of cross-section of an electrode assembly stack resulting when current collectors are applied to the active electrode material films of the stack of FIG. 2.

FIG. 3 illustrates, in a high level manner, a cross-section of an electrode assembly stack 300 resulting after the current collectors are applied to the active electrode material films on each side of the separator. As can be seen from the Figure, the layers of the stack 300 are arranged in the following order: (1) first current collector layer 305, (2) first film 310, (3) separator 320, (4) second film 330, and (5) second current collector 335. The stack 300 can be pressure laminated in a nip (calender) to enhance the adhesion of the films 310/330 to the separator 320, as well as the adhesion between the films 310/330 and their respective current collectors 305/335. Indeed, pressure lamination may bond the films to their respective current collectors even without the use of an adhesive on the interfaces between the current collectors and the films, particularly if the surfaces of the current collectors adjacent to their respective films are preprocessed (roughed and/or activated).

In one embodiment, current collectors may also be applied onto active electrode films by a spraying device. Various spray coating and/or impregnating methods can be used according to the present invention. Examples of suitable methods include flame spraying, arc spraying, plasma spraying, and high velocity oxygen fuel (HVOF) thermal spraying. In one embodiment, molten aluminum or another highly conductive material is used to coat one side of an electrode film as well as to penetrate inter-particle spaces in the film so as to create conductive pathways within the film. It is understood that the depth of the conductive pathways beneath the surface may vary according to application, for example, between practically no penetration and penetration through the full depth of the film.

In one embodiment, current collectors may also be applied onto active electrode films by deposition, for example, low-pressure or sub-atmospheric chemical vapor deposition (LPCVD or SACVD).

Various optimization techniques can be used to ensure that the conductive material penetrates and coats the active electrode films evenly. For example, in a spraying process, the spray velocity of the spray unit, the pressure of the spray, the standoff distance of the spray unit from the film, the vertical step distance, and the sweep rate of the spray unit can be adjusted to optimize coating and penetration.

Although conductive coating sprayed onto active electrode films may itself act as the current collector, in one embodiment, a current collector made from a sheet of conductive material (e.g., metal foil) may also be brought into contact with a sprayed conductive coating. When the coated side of an electrode film is placed against a current collector sheet, the conductive coating/current collector interface and conductive pathways in the film ("veins" resulting from the spraying) create low resistance electrical contacts between the film and the current collector. The benefits derived from such lowered resistance have been described and would be understood by those skilled in the art.

During deposition and spraying processes, the separator may advantageously act as a backing means to support each film, and as a heatsink to conduct heat away from the film. Consequently, damage to the films during spraying may be reduced or even eliminated.

Current collectors can be attached to their respective films substantially simultaneously or one at a time. For example, both current collectors may be sprayed at the same time using two spraying heads, or the current collectors may be sprayed one at a time.

At step 130, the combination (stack) of the separator, two films, and two current collectors is shaped as desired, for example, trimmed to predetermined dimensions.

At step 135, each current collector is electrically connected to a terminal, the combination of which can be used in the manufacture of a double-layer capacitor product.

The inventive electrodes and processes used in the course of their fabrication are described above in considerable detail for illustration purposes. Neither the specific embodiments of the invention as a whole, nor those of its features, limit the general principles underlying the invention. In particular, the invention is not limited to the specific materials and proportions of constituent materials used for fabricating the electrodes. The invention is also not limited to electrodes used in double layer capacitors, but extends to other electrode applications. The specific features described herein may be used in some embodiments, but not in others, without departure from the spirit and scope of the invention as set forth. Many additional modifications are intended in the foregoing disclosure, and it will be appreciated by those of ordinary skill in the art that, in some instances, some features of the invention will be employed in the absence of a corresponding use of other features. The illustrative examples therefore do not define the metes and bounds of the invention and the legal protection afforded the invention, which function is served by the claims and their equivalents.

We claim:

1. A double layer capacitor product comprising:
    a first layer of electrode material comprising a first surface and a second surface;
    a second layer of electrode material comprising a third surface and a fourth surface;
    a porous separator disposed between the first layer and the second layer so as to adjoin and be attached to the first surface and the third surface;
    a first current collector attached on the second surface; and
    a second current collector attached on the fourth surface;
    wherein
    the separator is attached to the first surface before the first current collector is attached to the second surface; and
    wherein
    the separator is attached to the third surface before the second current collector is attached to the fourth surface.

2. The double layer capacitor product of claim 1 wherein the electrode material comprises dry activated carbon particles, dry polymer and dry conduction promoter particles that are processed into the electrode material in a dry process.

3. The double layer capacitor product of claim 1 wherein the electrode material is self-supporting.

4. The double layer capacitor product of claim 1 wherein the separator is attached to the first and third surface before either current collector is attached to a surface.

5. The double layer capacitor product of claim 4, wherein the separator is attached to the first and third surface in the same process step.

6. The double layer capacitor product of claim 1 wherein the separator and attached electrode films are laminated together before the current collector is attached to either surface.

7. The double layer capacitor product of claim 1 wherein there is a layer of adhesive between the first surface and separator and the third surface and the separator.

8. The double layer capacitor product of claim 1 wherein there is a layer of adhesive between the first current collector and the second surface and a layer of adhesive between the second current collector and the fourth surface.

* * * * *